United States Patent Office 3,275,492
Patented Sept. 27, 1966

3,275,492
OPAL GLASS WITH A LOW COEFFICIENT OF THERMAL EXPANSION
Jean Leon Herbert, Saint Pierre-les-Nemours, Seine-et-Marne, France, assignor to Société des Verreries Industrielles Réunies du Loing, Paris, France
No Drawing. Filed Jan. 29, 1962, Ser. No. 169,661
Claims priority, application France, Feb. 3, 1961, 851,644
6 Claims. (Cl. 161—1)

The present invention relates to opal glasses characterized by a low coefficient of thermal expansion and a degree of opacity varying from a very light opalescense to a dense white opal. It is further concerned with an improved method of producing low expansion, heat resisting, opal glassware that does not require conventional opacifying agents such as fluorides or phosphates.

An opal glass is an otherwise normally transparent base glass containing an ingredient that dissolves during melting and precipitates in finely dispersed form during cooling or subsequent thermal treatment of the glass. Soda lime type base glass compositions are well adapted to production of opal glassware, but the resulting opal glasses and glass products are characterized by relatively high coefficients of thermal expansion on the order of $90 \times 10^{-7}$. Such glasses do not have sufficient resistance to thermal shock to permit their use in oven ware, and glass products having similar thermal requirements, except as the glassware is tempered subsequent to production. The expression "coefficient of expansion" is used in its usual sense to mean the average linear expansion in cm./cm./° C. over a temperature range of 20° C. to 300° C. as measured in conventional manner.

It is well known that borosilicate type glasses are generally characterized by low coefficients of thermal expansion in the range of 25 to $50 \times 10^{-7}$, and consequent resistance to thermal shock. However, it has proven difficult to satisfactorily opacify such base glasses with conventional opacifying agents such as fluorides and phosphates. The high temperatures required to melt borosilicate glasses, as well as other characteristics of such glasses, create problems in production of a dense homogeneous opal glass. In particular, fluoride opacifying agents tend to volatilize during the glass melting process as well as during subsequent forming of ware from the melt. As a result, there is an undue loss of opacifying agent, pollution of the surrounding atmosphere with obnoxious vapors, chemical attack on the refractory of the melting unit, and a generally transparent or pale opal product, especially adjacent the surface of the molded article. A variety of special opacifying agents for this type glass have been proposed, but have failed to adequately solve the problem of providing a homogeneous and otherwise satisfactory commercial opal glass product in a borosilicate base glass composition.

It is a primary purpose of the present invention to provide a means of overcoming these prior difficulties. A particular purpose is to provide opal glass compositions characterized by low coefficients of thermal expansion on the order of 25 to $50 \times 10^{-7}$, and consequent thermal shock resistance. A further purpose is to provide a method of opacifying borosilicate base glasses and varying the degree of opacity from a light or pale opalescence to a dense white opal. Another purpose is to provide opacified borosilicate type glasses having modified viscosity characteristics and consequent improved working characteristics. A further purpose is to provide opal glass products having desirable thermal and mechanical shock characteristics as well as desirable acid resistance and electrical properties.

Opal glasses in accordance with the present invention are obtained by introducing into an alkali-borosilicate type glass, as hereafter described, an opacifying agent selected from the group consisting of the following metal oxides and mixtures thereof: ZnO, MgO, CaO, BaO, NiO, CoO, MnO, CuO, such oxides being generically identified as "RO" for convenience. The effective proportions of the various glass components, in mol percent as calculated from the glass batch, are within the following ranges:

the glass forming oxides $B_2O_3$ and $SiO_2$ are present in total amount of from 75 to 95%, the mol ratio of $B_2O_3$ to $SiO_2$ varying from 0.1 to 0.6, the metal oxides identified above as opacifying agents (RO) are present in an amount totaling from 3 to 24%, the monovalent modifying oxides, generically identified as $R_2O$ and selected essentially from $Li_2O$, $K_2O$, and $Na_2O$, are present in an amount totaling from 1 to 7%; the mol ratio between the content of these monovalent alkali metal oxides and the opacifying oxides, i.e. $R_2O/RO$, being from 0.1 to 1.0, except when $Li_2O$ is selected as the modifying oxide in which case the ratio is from 0.07 to 1.5, the content of alumina, $Al_2O_3$, if that oxide is present, does not exceed 1%.

The glasses thus defined generally have coefficients of thermal expansion within the range of 25 to $50 \times 10^{-7}$ over the temperature range of 20° C. to 300° C.

The alkali metal oxide content in a particular glass will depend primarily on the degree of opacity desired and on the desired coefficient of thermal expansion. The degree or density of opacity in a particular glass will generally decrease, assuming all other conditions equal, as the ratio between the alkali metal oxides and the opacifying oxides increases. Various physical properties of the present glasses, such as the coefficient of thermal expansion, the temperature-viscosity relationship, the dielectric characteristics and the glass working range, may be varied by varying the alkali metal modifying and the opacifying oxides selected, the ratio between alkali metal oxides and opacifying oxides and the ratio between $B_2O_3$ and $SiO_2$.

The degree or density of opacity in a glass will depend to some extent on the opacifying oxide selected. It will also depend on the ratio between the modifying alkali metal oxides and the opacifying oxides. In general, as this ratio increases the opal density decreases with the result that a paler opal is obtained.

In general, the opacifying agent will "strike in," that is precipitate throughout the glass article, during production of the article by such methods as casting, blowing, molding and extruding. Where the opacifying agent "strikes in" slowly, or where the glass article is quickly cooled before opacity develops, the glass will be thermally opacifiable, that is the opacifying agent will precipitate during a subsequent heat treatment of the article. The tter method of developing opacity in a glass makes it so possible to obtain a material having an appearance similar to that of china, but possessing a texture which under microscopic examination displays a high degree of homogeneity and fine structure. The relatively high temperatures at which the opacity is thermally developed within the glass, makes it practical to fire an enamel type decoration on the glass surface simultaneously with such thermal opacification.

Prior commercial borosilicate glasses, which have a high silica content and a coefficient of thermal expansion on the order of $30 \times 10^{-7}$ between 20 and 300° C., require extremely high working temperatures. The present glasses are comparable to these prior commercial glasses insofar as silica content and thermal coefficient of expansion are concerned, but, in contrast, are adapted to being worked, that is melted and formed into glass articles, at considerably lower temperatures. In addition, the temperature viscosity characteristics of the present glasses are such that at their lower working temperatures, their viscosity is substantially lower than that of the prior glasses at corresponding temperatures. This favorable situation results from the present glasses having a viscosity curve, that is a curve based on glass viscosity plotted as a function of glass temperature, that is much steeper than in the prior borosilicate glasses.

The viscosity characteristics of the present glasses facilitate refining of the glass during the melting operation. They also enable to avoid the use of refining agents such as sodium sulfate which, at higher melting temperatures, would attack alumina containing refractory materials and thus lead to an undesirable increase in alumina content of the resulting glass. While the conventional refining agent such as sulfates or halogen compounds may therefore be employed if desired, it has been found that the present glasses may normally be produced without addition of such fining agents.

A primary advantage of the present invention lies in the ability to produce a low expansion, opal borosilicate glass without employing the conventional fluoride or phosphate opacifying agents. However, in certain cases it is advantageous to employ small amounts of known opacifying agents as a secondary or supplmental agent in conjunction with the primary opacifying agents described above. The amount of such secondary opacifying agent will be much smaller than that required where such agent is employed alone to produce opacity. Thus, the amounts of such secondary opacifying agents, if present, will normally not exceed about 4 mol percent F, 2 mol percent $P_2O_5$, or 5 mol percent $CeO_2$, these secondary agents being capable of use either individually or in combination.

The present glasses require no special melting conditions and may be melted in accordance with conventional borosilicate glass melting practice. Thus, they may be melted in a gas fired continuous glass melting unit at temperatures of about 1450 to 1600° C., the particular melting conditions for any given glass being determined from its physical properties in the usual manner. Batch materials may also be of conventional nature as indicated in the subsequent specific examples.

The following exemplary compositions, shown both in batch form and in oxide form as calculated both in percent by weight and mol percent from such batch composition, will serve to further illustrate the invention while not limiting its scope. In particular, the examples illustrate the manner in which opacity and expansion may be varied by selection of different constituent oxides and differing proportions of such oxides.

| Batch Composition | Examples | | |
|---|---|---|---|
| | I | II | III |
| Sand | 100 | 100 | 100 |
| Boric oxide | 46.2 | 46.2 | |
| Boric acid | | | 33 |
| Zinc oxide | 7.7 | 7.7 | 12.7 |
| Calcium Carbonate | | | 11.3 |
| Potassium Chloride | 4.6 | 1.5 | 2.1 |
| Sodium Sulfate | 4.6 | 1.5 | 5.6 |

| Oxide Composition | Weight percent | Mol percent | Weight percent | Mol percent | Weight percent | Mol percent |
|---|---|---|---|---|---|---|
| $SiO_2$ | 63.0 | 67.2 | 64.4 | 68.0 | 70.7 | 74.0 |
| $B_2O_3$ | 29.0 | 26.4 | 29.7 | 27.0 | 13.2 | 11.8 |
| ZnO | 4.8 | 3.8 | 4.9 | 4.0 | 9.0 | 6.9 |
| CaO | | | | | 4.5 | 5.0 |
| $K_2O$ | 1.9 | 1.3 | 0.6 | 0.45 | 0.9 | 0.6 |
| $Na_2O$ | 1.3 | 1.3 | 0.4 | 0.45 | 1.7 | 1.7 |
| $B_2O_3/SiO_2$ | | 0.39 | | 0.39 | | 0.16 |
| $R_2O/RO$ | | 0.68 | | 0.21 | | 0.33 |
| Exp. Coef./C.°×$10^{-7}$ | 36 | | 35 | | 32 | |

The glasses of Examples I and II were melted at a temperature of 1580° C. A four mm. thick plate of glass I was a weak or pale opal; a similar plate of glass II showed a much stronger degree of opacity; and glass III provided a still greater degree of opacity.

The following example illustrates a glass that is transparent when handled under the same conditions as prescribed for the glasses of the preceding examples. This becomes opacified by heat treatment for one hour at 900° C.

| Batch Composition | Example IV |
|---|---|
| Sand | 100 |
| Boric oxide | 46 |
| Boric acid | |
| Zinc oxide | 7.7 |
| Calcium Carbonate | |
| Potassium Chloride | 6.2 |
| Sodium sulfate | 6.2 |

| Oxide Composition | Weight percent | Mol percent |
|---|---|---|
| $SiO_2$ | 62.4 | 66.6 |
| $B_2O_3$ | 28.8 | 26.3 |
| ZnO | 4.8 | 3.8 |
| CaO | | |
| $K_2O$ | 2.4 | 1.6 |
| $Na_2O$ | 1.6 | 1.7 |
| $B_2O_3/SiO_2$ | | 0.39 |
| $R_2O/RO$ | | 0.87 |
| Exp. Coef./C.°×$10^{-7}$ | 38 | |

The following examples illustrate further compositions in accordance with the invention, together with the expansion coefficient and opal color of a glass produced from each composition.

| Compositions | Examples | | | | | | | |
|---|---|---|---|---|---|---|---|---|
| | V | | VI | | VII | | VIII | |
| Batch: | | | | | | | | |
| Sand | 100 | | 100 | | 100 | | 100 | |
| B$_2$O$_3$ | 21.4 | | 19.5 | | 19.5 | | 19.5 | |
| ZnO | 15.7 | | | | | | | |
| CaCO$_3$ | | | 27.8 | | | | | |
| BaCO$_3$ | | | | | 20.1 | | | |
| NiO | | | | | | | 18.8 | |
| KCl | | | 2.1 | | 2.1 | | 2.1 | |
| Na$_2$SO$_4$ | 2.8 | | 3.5 | | 3.5 | | 3.5 | |
| Na$_2$CO$_3$ | 2.1 | | | | | | | |
| NaCl | 2.5 | | | | | | | |
| | Weight Percent | Mol Percent | Weight Percent | Mol Percent | Weight Percent | Mol Percent | Weight Percent | Mol Percent |
| Oxide: | | | | | | | | |
| SiO$_2$ | 71.0 | 75.0 | 72.6 | 73.7 | 72.6 | 80.0 | 70.9 | 74.7 |
| B$_2$O$_3$ | 15.2 | 13.7 | 14.1 | 12.3 | 14.1 | 13.3 | 13.8 | 12.4 |
| ZnO | 11.2 | 8.7 | | | | | | |
| CaO | | | 11.3 | 12.3 | | | | |
| BaO | | | | | 11.3 | 4.9 | | |
| NiO | | | | | | | 13.3 | 11.2 |
| K$_2$O | | | 0.9 | 0.6 | 0.9 | 0.6 | 0.9 | 0.6 |
| Na$_2$O | 2.6 | 2.6 | 1.1 | 1.1 | 1.1 | 1.2 | 1.1 | 1.1 |
| B$_2$O$_3$/SiO$_2$ | | 0.18 | | 0.17 | | 0.17 | | 0.17 |
| R$_2$O/RO | | 0.30 | | 0.14 | | 0.37 | | 0.15 |
| Exp. Coef.×10$^{-7}$ | 28 | | 37 | | 35 | | 34 | |
| Color | Bluish White | | White | | White | | Gray Green | |

| Batch Composition | Examples | | | | | |
|---|---|---|---|---|---|---|
| | IX | | X | | XI | |
| Sand | 100 | | 100 | | 100 | |
| B$_2$O$_3$ | 19.5 | | 19.5 | | 19.5 | |
| MnCO$_3$ | 25.8 | | | | | |
| CoO | | | 18.8 | | | |
| CuO | | | | | 18.8 | |
| KCl | 2.1 | | 2.1 | | 2.1 | |
| Na$_2$SO$_4$ | 3.5 | | 3.5 | | 3.5 | |
| Oxide Composition | Weight Percent | Mol Percent | Weight Percent | Mol Percent | Weight Percent | Mol Percent |
| SiO$_2$ | 72.4 | 75.6 | 70.9 | 74.7 | 70.9 | 75.1 |
| B$_2$O$_3$ | 14.1 | 12.6 | 13.8 | 12.5 | 13.8 | 12.6 |
| MnO | 11.5 | 10.1 | | | | |
| CoO | | | 13.3 | 11.1 | | |
| CuO | | | | | 13.3 | 10.6 |
| K$_2$O | 0.9 | 0.6 | 0.9 | 0.6 | 0.9 | 0.6 |
| Na$_2$O | 1.1 | 1.1 | 1.1 | 1.1 | 1.1 | 1.1 |
| B$_2$O$_3$/SiO$_2$ | | 0.17 | | 0.17 | | 0.17 |
| R$_2$O/RO | | 0.17 | | 0.15 | | 0.16 |
| Exp. Coef.×10$^{-7}$ | 33 | | 31 | | 25 | |
| Color | Pink Gray | | Blue | | Yellow | |

| Batch Composition | Examples | | | | | |
|---|---|---|---|---|---|---|
| | XII | | XIII | | XIV | |
| Sand | 100 | | 100 | | 100 | |
| B$_2$O$_3$ | 22.9 | | 19.5 | | 18.3 | |
| Boric acid | | | | | | |
| ZnO | 11.4 | | | | 11.3 | |
| MgCO$_3$ | | | 32.8 | | 5.6 | |
| CaCO$_3$ | | | | | 9.9 | |
| KCl | 4.3 | | 2.1 | | | |
| Na$_2$SO$_4$ | 2.8 | | 2.8 | | 2.8 | |
| Na$_2$CO$_3$ | | | 2.1 | | 4.2 | |
| Oxide Composition | Weight Percent | Mol Percent | Weight Percent | Mol Percent | Weight Percent | Mol Percent |
| SiO$_2$ | 72.6 | 76.5 | 72.0 | 69.8 | 70.6 | 72.7 |
| B$_2$O$_3$ | 16.5 | 14.9 | 14.0 | 11.6 | 13.0 | 11.4 |
| ZnO | 8.2 | 6.4 | | | 8.0 | 6.1 |
| MgO | | | 11.3 | 16.4 | 1.9 | 2.9 |
| CaO | | | | | 3.9 | 4.3 |
| K$_2$O | 1.9 | 1.3 | 0.9 | 0.6 | | |
| Na$_2$O | 0.8 | 0.9 | 1.8 | 1.6 | 2.6 | 2.6 |
| B$_2$O$_3$/SiO$_2$ | | 0.19 | | 0.17 | | 0.16 |
| R$_2$O/RO | | 0.34 | | 0.13 | | 0.19 |
| Exp. Coef.×10$^{-7}$ | 27 | | 35 | | 34 | |
| Color | Pale opal | | White | | White | |

| Oxides | Examples | | |
|---|---|---|---|
| | XV Mol Percent | XVI Mol Percent | XVII Mol Percent |
| SiO₂ | 74.1 | 75.6 | 80.3 |
| B₂O₃ | 13.4 | 10.3 | 13.4 |
| ZnO | 7.7 | | |
| CaO | 1.9 | 1.1 | |
| MgO | | 10.6 | |
| Li₂O | | | |
| K₂O | 0.6 | 1.2 | 0.6 |
| Na₂O | 1.7 | 0.9 | 1.2 |
| P₂O₅ | 0.6 | | |
| CeO₂ | | | 4.5 |
| Al₂O₃ | | | |
| F | | 3.4 | |
| B₂O₃/SiO₂ | 0.18 | 0.14 | 0.16 |
| R₂O/RO | 0.24 | 0.18 | 0.40 |
| Exp. Coef. ×10⁻⁷ | 30 | | |
| Opacity | (¹) | (²) | (³) |

¹ White.   ² Dense.   ³ Opal light brown.

Transparency of comparable glass articles produced from the compositions of Examples XII to XV was measured in terms of light having a wave length of 530 microns. The measurements were made on an apparatus produced by Zeiss and available under the mark Elrepho, the following measured values being observed:

| Examples | XII | XIII | XIV | XV |
|---|---|---|---|---|
| Transparency T | 0.69 | 0.16 | 0.15 | 0.15 |

It will be observed that the glass batches of the foregoing examples may contain on the order of 5 to 6% of alkaline metal sulfates, and/or chlorides. However, the glass obtained by melting any one of these batches will normally be found to contain less than 0.2% by weight $SO_3$, or Cl. In the event that it is desirable to avoid the presence of sulfate or chloride ions entirely, glasses corresponding to those shown in the examples may be melted from batches wherein other conventional raw materials are employed in lieu of sulfates or chlorides, e.g. potassium and sodium carbonates as given in following Examples I Bis to XV Bis.

| Batch Composition | Examples | | | |
|---|---|---|---|---|
| | I Bis | | II Bis | |
| Sand | 100 | | 100 | |
| Boric oxide | 46.2 | | 46.2 | |
| Zinc Oxide | 7.7 | | 7.7 | |
| Potassium carbonate | 4.25 | | 1.39 | |
| Sodium carbonate | 3.45 | | 1.12 | |
| Oxide Composition | Weight Percent | Mol Percent | Weight Percent | Mol Percent |
| SiO₂ | 63.0 | 67.2 | 64.4 | 68.0 |
| B₂O₃ | 29.0 | 26.4 | 29.7 | 27.0 |
| ZnO | 4.8 | 3.8 | 4.9 | 4.0 |
| K₂O | 1.9 | 1.3 | 0.6 | 0.45 |
| Na₂O | 1.3 | 1.3 | 0.4 | 0.45 |

| Batch Composition | Example III Bis |
|---|---|
| Sand | 100 |
| Boric acid | 33 |
| Zinc oxide | 12.7 |
| Calcium carbonate | 11.3 |
| Potassium carbonate | 1.94 |
| Sodium carbonate | 4.18 |

| Oxide Composition | Mol Percent | Mol Percent |
|---|---|---|
| SiO₂ | 70.7 | 74.0 |
| B₂O₃ | 13.2 | 11.8 |
| ZnO | 9.0 | 6.9 |
| CaO | 4.5 | 5.0 |
| K₂O | 0.9 | 0.6 |
| Na₂O | 1.7 | 1.7 |

| Batch Composition | Example IV Bis |
|---|---|
| Sand | 100 |
| B₂O₃ | 46 |
| ZnO | 7.7 |
| Potassium carbonate | 5.73 |
| Sodium carbonate | 4.63 |

| Oxide Composition | Weight Percent | Mol Percent |
|---|---|---|
| SiO₂ | 62.4 | 66.6 |
| B₂O₃ | 28.8 | 26.3 |
| ZnO | 4.8 | 3.8 |
| K₂O | 2.4 | 1.6 |
| Na₂O | 1.6 | 1.7 |

| Batch Compositions | Examples | | | | | |
|---|---|---|---|---|---|---|
| | V Bis | | VI Bis | | VII Bis | |
| Sand | 100 | | 100 | | 100 | |
| B₂O₃ | 21.4 | | 19.5 | | 19.5 | |
| ZnO | 15.7 | | | | | |
| CO₃Ca | | | 27.8 | | | |
| CO₃Ba | | | | | 20.1 | |
| CO₃K₂ | | | 1.94 | | 1.94 | |
| CO₃Na₂ | 6.45 | | 2.62 | | 2.62 | |
| Oxide Composition | Weight percent | Mol percent | Weight percent | Mol percent | Weight percent | Mol percent |
| SiO₂ | 71.0 | 75.0 | 72.6 | 73.7 | 72.6 | 80.0 |
| B₂O₃ | 15.2 | 13.7 | 14.1 | 12.3 | 14.1 | 13.3 |
| ZnO | 11.2 | 8.7 | | | | |
| CaO | | | 11.3 | 12.3 | | |
| BaO | | | | | 11.3 | 4.9 |
| K₂O | | | 0.9 | 0.6 | 0.9 | 0.6 |
| Na₂O | 2.6 | 2.6 | 1.1 | 1.1 | 1.1 | 1.2 |

| Batch Compositions | Examples | | | |
|---|---|---|---|---|
| | VIII Bis | IX Bis | X Bis | XI Bis |
| Sand | 100 | 100 | 100 | 100 |
| $B_2O_3$ | 19.5 | 19.5 | 19.5 | 19.5 |
| NiO | 18.8 | | | |
| $CO_3Mn$ | | 25.8 | | |
| CoO | | | 18.8 | |
| CuO | | | | 18.8 |
| $CO_3K_2$ | 1.94 | 1.94 | 1.94 | 1.94 |
| $CO_3Na_2$ | 2.62 | 2.62 | 2.62 | 2.62 |

| Oxide Composition | Weight percent | Mol percent | Weight percent | Mol percent | Weight percent | Mol percent | Weight percent | Mol percent |
|---|---|---|---|---|---|---|---|---|
| $SiO_2$ | 70.9 | 74.7 | 72.4 | 75.6 | 70.9 | 74.6 | 70.9 | 75.1 |
| $B_2O_3$ | 13.8 | 12.4 | 14.1 | 12.6 | 13.8 | 12.5 | 13.8 | 12.6 |
| NiO | 13.3 | 11.2 | | | | | | |
| MnO | | | 11.5 | 10.1 | | | | |
| CoO | | | | | 13.3 | 11.1 | | |
| CuO | | | | | | | 13.3 | 10.6 |
| $K_2O$ | 0.9 | 0.6 | 0.9 | 0.6 | 0.9 | 0.6 | 0.9 | 0.6 |
| $Na_2O$ | 1.1 | 1.1 | 1.1 | 1.1 | 1.1 | 1.1 | 1.1 | 1.1 |

| Batch Compositions | Examples | | | |
|---|---|---|---|---|
| | XII Bis | XIII Bis | XIV Bis | XV Bis |
| Sand | 100 | 100 | 100 | 100 |
| Boric oxide | 22.9 | 19.5 | 18.3 | |
| Boric acid | | | | 37.2 |
| Zinc oxide | 11.4 | | 11.3 | 14.1 |
| Magnesium carbonate | | 3.28 | 5.65 | |
| Calcium carbonate | | | 9.90 | |
| Calcium phosphate | | | | 4.5 |
| Potassium carbonate | 3.97 | 1.94 | | 1.94 |
| Sodium carbonate | 2.10 | 4.20 | 6.30 | 4.20 |

| Oxide Composition | Weight percent | Mol percent | Weight percent | Mol percent | Weight percent | Mol percent | Weight percent | Mol percent |
|---|---|---|---|---|---|---|---|---|
| $SiO_2$ | 72.6 | 76.4 | 72.0 | 69.8 | 70.6 | 72.7 | 69.9 | 74.1 |
| $B_2O_3$ | 16.5 | 14.9 | 14.0 | 11.6 | 13.0 | 11.4 | 14.6 | 13.4 |
| ZnO | 8.2 | 6.4 | | | 8.0 | 6.1 | 9.8 | 7.7 |
| MgO | | | 11.3 | 16.4 | 1.9 | 2.9 | | |
| CaO | | | | | 3.9 | 4.3 | 1.7 | 1.9 |
| $K_2O$ | 1.9 | 1.3 | 0.9 | 0.6 | | | 0.9 | 0.6 |
| $Na_2O$ | 0.8 | 0.9 | 1.8 | 1.6 | 2.6 | 2.6 | 1.7 | 1.7 |
| $P_2O_5$ | | | | | | | 1.4 | 0.6 |

In addition to the advantageous characteristics already described, glasses according to the invention also provide various other advantages. They are resistant to mechanical shock, probably due to homogeneity of the dispersed phase. They are also easy to effectively anneal, have good resistance to attack by water or acids, and possess desirable dielectric properties, thus rendering them particularly useful in electronic applications.

When the opacification is developed within a glass article after its formation, it is possible to obtain a great precision of the degree of opacity by controlling the thermal treatment. It is thus possible to limit the dimensions of the diffusing particles in order to obtain for a given spectral light area, the desired diffuse reflection coefficient.

It is consequently possible to produce glass articles with the exactly convenient matching of the decoration and of the coloration and opacity of the support.

An example of a combined thermal treatment for opacification and enameling of a glass according to the invention, is given hereafter:

The glass has the following composition:

| | Weight | Mol percent | |
|---|---|---|---|
| $SiO_2$ | 62.4 | 66.6 | |
| $B_2O_3$ | 28.8 | 26.3 | $B_2O_3/SiO_2=0.39$. |
| $K_2O$ | 2.4 | 1.6 | |
| $Na_2O$ | 1.6 | 1.7 | |
| ZnO | 4.8 | 3.8 | |
| | | | $R_2O/RO=0.88$. |
| | | | Exp. Coef.×$10^{-7}=38$. |

A series of vessels is produced by pressing from the glass having the above composition. To these vessels different types of decoration are applied by decalcomania.

Thereafter the vessels are brought to a temperature from 750 to 780° C. for duration varying from one another between several minutes to one hour. The resulting articles present different opacities, increasing with the duration of the thermal treatment, and matching in the desired manner with the decoration chosen for each of them.

What is claimed is:

1. An opacifiable borosilicate glass composition having a coefficient of expansion on the order of 25 to $50 \times 10^{-7}$ consisting essentially on a mol percent basis of:
   (a) 10–27% (equivalent to about 12–30 weight percent of $B_2O_3$
   (b) 66–81% (equivalent to about 62–76 weight percent) of $SiO_2$
   (c) 3–24% of an opacifying agent (RO) selected from the group consisting of ZnO, MgO, CaO, BaO, NiO, MnO, CoO, CuO and mixtures thereof,
   (d) 1–7% alkali metal oxides ($R_2O$) selected from the group consisting of $Li_2O$, $K_2O$ and $Na_2O$, and wherein there is an $R_2O/RO$ mol ratio of 0.1 to 1.0 when $K_2O$ and $Na_2O$ are present and a mol ratio of 0.07 to 1.5 when $Li_2O$ is present.

2. An opacifiable glass composition as in claim 1 wherein there is contained $Al_2O_3$ in an amount less than 1 mol percent.

3. An opacifiable glass composition as in claim 1 wherethe content of $SO_3$ plus Cl does not exceed about .2%.

4. An opacifiable glass as in claim 1 containing further secondary opacifying agents selected from the group consisting of up to 4% F, up to 2% $P_2O_5$ and up to 5% $CeO_2$.

5. A method of producing an opal glass having a coefficient of expansion on the order of 25 to $50 \times 10^{-7}$ which comprises incorporating 3–24 mol percent of an opacifying agent selected from the group consisting of ZnO, MgO, CaO, BaO, NiO, MnO, CoO, CuO, and mixtures thereof into an alkali borosilicate glass consisting essentially of 10–27 mol percent (equivalent to about 2–30 weight percent) of $B_2O_3$, 66–81 mol percent (equivalent to about 62–76 weight percent) of $SiO_2$, and 2–7% of an alkali metal oxide selected from the group consisting of $Li_2O$, $K_2O$ and $Na_2O$ and subjecting said glass to a heat treatment to develop said opal glass.

6. An opal glass product made by the process of claim 5.

References Cited by the Examiner
UNITED STATES PATENTS

| | | | |
|---|---|---|---|
| 1,656,260 | 1/1928 | Zeh | 117—3.2 |
| 2,651,146 | 9/1953 | Stookey | 65—33 X |
| 2,920,971 | 1/1960 | Stookey | 65—33 X |
| 3,017,279 | 1/1962 | Van Dolah | 106—52 X |
| 3,057,691 | 10/1962 | Veres | 65—33 |

DONALL H. SYLVESTER, *Primary Examiner.*

G. MYERS, *Assistant Examiner.*

UNITED STATES PATENT OFFICE
CERTIFICATE OF CORRECTION

Patent No. 3,275,492

September 27, 1966

Jean Leon Herbert

It is hereby certified that error appears in the above numbered patent requiring correction and that the said Letters Patent should read as corrected below.

Column 4, line 48, after "This" insert -- glass --; column 8, line 27, for "Mol Percent", first occurrence, read -- Weight Percent --; columns 9 and 10, in the second table, under the heading "XIII Bis" and opposite "Magnesium carbonate", for "3.28" read -- 32.8 --; column 10, line 49, for "duration" read -- durations --.

Signed and sealed this 22nd day of August 1967.

(SEAL)
Attest:

ERNEST W. SWIDER
Attesting Officer

EDWARD J. BRENNER
Commissioner of Patents